US006905747B2

(12) United States Patent
Auchter et al.

(10) Patent No.: US 6,905,747 B2
(45) Date of Patent: Jun. 14, 2005

(54) LABEL AND DISPOSITION OF ADHESIVE AND ADHESIVE RELEASE

(75) Inventors: Glenn A. Auchter, Parkland, FL (US); Warren M. Fabel, Boca Raton, FL (US)

(73) Assignee: Laser Substrates, Inc., Boca Raton, FL (US)

( * ) Notice: Subject to any disclaimer, the term of this patent is extended or adjusted under 35 U.S.C. 154(b) by 11 days.

(21) Appl. No.: 10/430,459

(22) Filed: May 5, 2003

(65) Prior Publication Data

US 2004/0166286 A1 Aug. 26, 2004

Related U.S. Application Data

(60) Provisional application No. 60/450,455, filed on Feb. 26, 2003.

(51) Int. Cl.[7] .................................................. B32B 3/00

(52) U.S. Cl. ........................ 428/40.1; 283/81; 428/41.8; 428/42.1; 428/42.2; 428/192; 428/194; 428/201; 428/202

(58) Field of Search ............................... 428/40.1, 41.8, 428/42.1, 42.2, 192, 194, 201, 202; 283/81

(56) References Cited

U.S. PATENT DOCUMENTS 5,782,494 A * 7/1998 Crandall et al. ............... 281/2
6,083,593 A * 7/2000 LaLande et al. ........... 428/42.2

* cited by examiner

*Primary Examiner*—Nasser Ahmad
(74) *Attorney, Agent, or Firm*—Ted W. Whitlock; Jon A. Gibbons; Fleit, Kain, Gibbons, Gutman, Bongini & Bianco, P.L.

(57) ABSTRACT

A form or label assembly formed by front and back plies which is printable on a non-impact printer such as a laser printer which is not subject to flaking or unintentional removal of the toner during operation.

20 Claims, 6 Drawing Sheets

LABEL AND DISPOSITION OF ADHESIVE AND ADHESIVE RELEASE

CROSS-REFERENCE TO RELATED APPLICATIONS

This is a continuation-in-part of U.S. Provisional Application Ser. No. 60/450,455, filed Feb. 26, 2003.

BACKGROUND OF THE INVENTION

This invention relates to labels and forms, including business or postal forms which are used with non-impact printers, for example, laser printers. Many types of specialized business forms are made of a porous paper or other relatively porous printable material, e.g., acetate, for use with non-impact printers such as laser printing devices. Adhesive and adhesive-release (e.g., silicon) are typical, if not required, components of pressure-sensitive mailing form or label products.

A common problem with such forms is that after passing the form through the printing device to imprint variable information, the print toner fails to properly bond to the form and can flake away or is easily removed from the surface of the form when manipulated by a user. This problem is especially prominent when the form is a peel-off label wherein the label is bent or otherwise manipulated to be peeled away from a backing substrate to expose adhesive.

It is perceived that the flaking of print toner, e.g., a xerographic toner which can comprise a granulated thermoplastic having a magnetic component formulated therein, results from the toner being improperly affixed or fused to the paper or other substrate material used in pressure-sensitive products, even after being heat-fixed by conventional printer processing. This improper fusion results from the adhesive and/or adhesive-release material disposed onto the surface of the substrate conducting heat away from any area on which it is applied. Thus, the toner cannot be properly heat-fixed onto the substrate. In addition, the toner may be prevented from absorbing into the pores or adsorbing onto the substrate where adhesive and adhesive-release are applied, and is thereby prevented from properly fusing to the substrate in a way that provides for substantially permanent bonding.

Thus, what is needed in the art is a label or other business mailing form which provides a print surface which substantially eliminates improper bonding or fusion of print toner, e.g., laser xerographic or thermoplastic print toner, and which can thereby prevent flaking or easy removal of the toner from the substrate surface following printing and heat-fixing.

SUMMARY OF THE INVENTION

In accordance with the subject invention, there is provided a form or label made of material which can receive, substantially permanently, laser toner on its outer or top face, and an adhesive for affixing the form or label to another surface disposed on its opposing inner face, the adhesive being disposed in a manner which does not interfere with the substantial permanence of the laser toner disposed on the outer face.

In a preferred embodiment, the subject invention concerns a two-ply form or label having a top ply and a backing ply wherein the top ply can have die-cuts or perforations defining the shape of the form or label. Preferably, the top ply comprises an outer face for receiving print toner for printing variable information on the form or label and an inner face comprising adhesive.

The backing ply has a back or outer face which typically does not receive variable print information, but which can be printed with instructional or other non-variable information (including source information, logos, or the like), and an inner face on which adhesive-release material can be disposed. Most preferably, the adhesive-release material is disposed in a pattern wherein it mates to the adhesive material disposed on the inner surface of the top ply such that the top and back plies can be separated from one another to expose the adhesive for affixing the top ply label or form to a different surface.

In a more preferred embodiment, the subject invention comprises adhesive and adhesive-release material patternly disposed on the inner surfaces of the top and back plies. The adhesive and adhesive release material is disposed in a pattern such that any area corresponding to the outer face of the top ply that receives print toner is adhesive-free and/or adhesive release-free. Thus, it is contemplated that the adhesive-free and adhesive release-free area is preferably disposed along an outer edge or on a perimeter edge of the label or form to border or frame the print area of the top ply outer surface.

For a rectangular shaped label, the framing pattern of adhesive and/or adhesive release material can be disposed on at least one perimeter edge of the inner faces of the plies, preferably along at least two opposing perimeter edges of the plies, more preferably along three perimeter edges of the inner faces of the plies, and most preferably along all four perimeter edges of the inner faces of the plies. A person of ordinary skill in the art would recognize that the disposition pattern of the adhesive and adhesive release material could vary according to size and shape of the label or form, as well as the intended adhesion desired. For example, it is desired to obtain the maximum adhesion for the label with another surface; therefore, a frame of adhesive and adhesive release material bordering the entire perimeter edge of the label would be preferred. In addition, the preferred embodiment of the subject invention comprises a adhesive or adhesive release material which is slightly offset from the outer edge of the label sheet so that an adhesive-free or adhesive release-free gap is provided between the edge of the label sheet in order to prevent oozing of the adhesive or adhesive release material beyond the edges of the label sheet during the printing process. A preferred embodiment has no such gap of adhesive and/or adhesive material along the perimeter edges of the die-cuts forming the peel-off labels disposed on the sheet.

In one preferred embodiment of the subject invention, the labels can be formed with slits or pores die-cut or otherwise formed therein. These slits or pores provide a means for releasing air from air pockets that can form under the label, within the perimeter frame of adhesive when the label is in use, e.g., when applied to another surface. Preferably, these slits or pores are formed of a small dimension so that the integrity of the label is unaffected when it is in use or otherwise being manipulated by the user.

BRIEF DESCRIPTION OF THE DRAWINGS

Preferred embodiments of the subject invention are herein described with specific reference being made to the following Figures, in which.

Figure 7A:
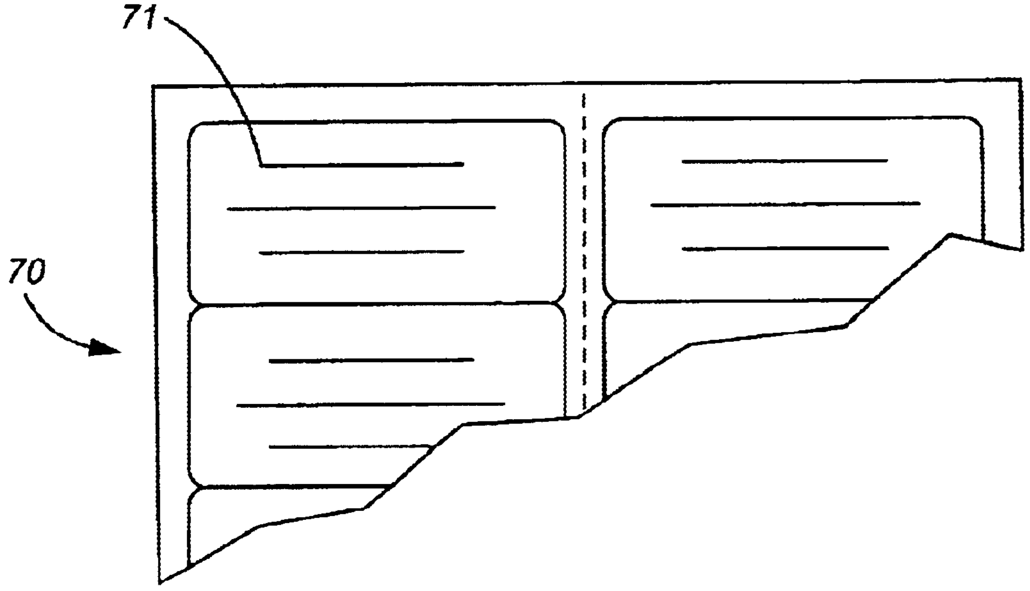
Figure 7B:
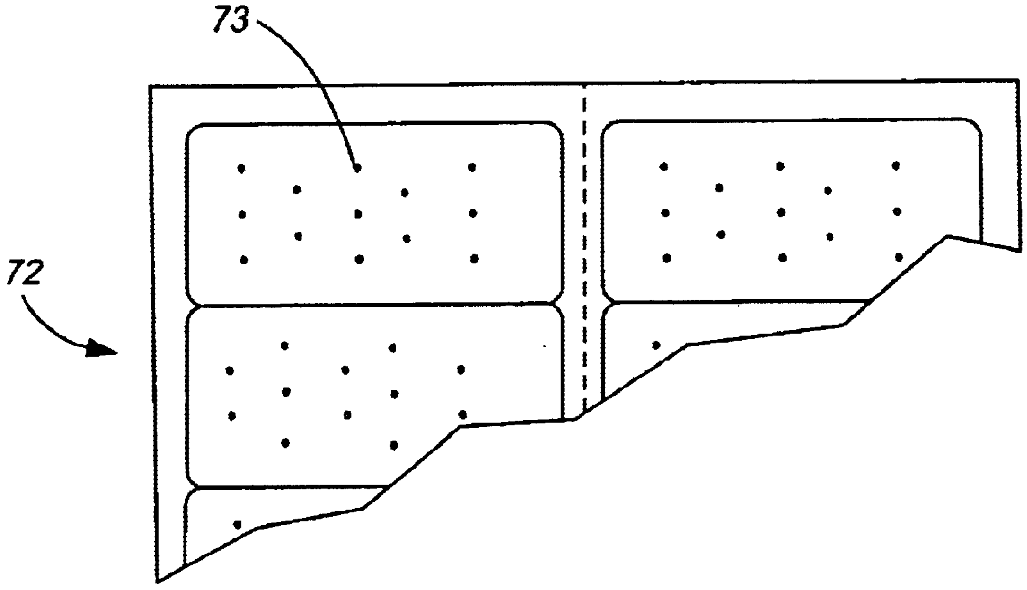

(a) Peeling off a label from the label sheet assembly;

(b) removing the label completely from the label sheet to expose adhesive disposed on the inner face of the label; and (c) adhering the removed label onto another surface;

FIGS. 7A and 7B show two embodiments of a label according to the subject invention having slits formed therein (FIG. 7A), or pores formed therein (FIG. 7B), said slits or pores being provided to allow the escape of air from the adhesive-free area and thereby prevent formation of air pockets under the label when the label is applied to another surface.

DETAILED DESCRIPTION

The subject invention concerns a novel label sheet or printed form assembly which can advantageously prevent flaking or unintentional removal of print toner deposited onto the outer surface of the label or form. A preferred embodiment of the subject invention comprises a label or form assembly constructed of at least two plies preferably affixed together to form a single sheet label or form assembly. The first ply provides a label or other print substrate printable by a non-impact printer, e.g., a laser printer, wherein the adhesive or adhesive release material is disposed between the plies in a manner that prevents or reduces the incidence of flaking or unintentional removal of the print toner following heat-fixing of the toner onto the outer surface of the label or form. The second ply is a backing ply, the inner face of which opposes the inner face of the top ply. Adhesive release material can be disposed on this inner face of the backing ply in a pattern corresponding to the adhesive pattern of the inner face of the top ply.

As would be readily understood by persons of ordinary skill in the art, the manufacture of the label or form assembly comprises providing a sheet of paper or other printable material for each ply, and patternly disposing adhesive and/or adhesive release material on the desired areas on one face of each ply. The plies can then be adjoined to form a single, two-ply sheet which can be pre-printed to provide desired color, text, or other printed features specific to the forms of the assembly. The assembly can then be perforated or die-cut as predetermined by the intended design of the assembly.

Figure 1:
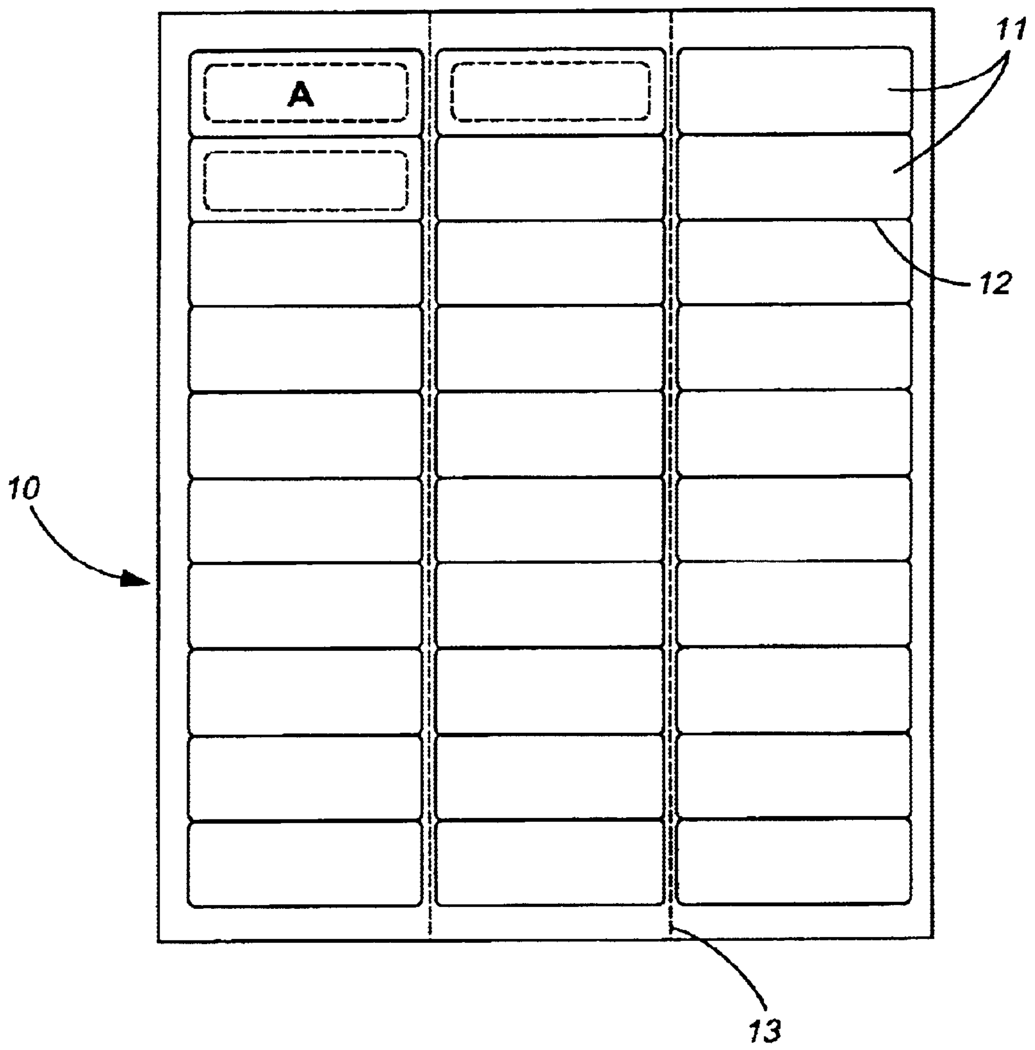
FIG. 1 is a plan view of the front, or outer, face of the top ply of a label sheet assembly according to one embodiment of the subject invention, illustrating by dotted lines a print area of each label formed in the label sheet (said dotted lines framing the print area forming no part of the invention)

Preferred embodiments of the subject invention are shown in FIGS. 1–7. FIG. 1 is a plan view of the front, or outer, face of the top ply of a label sheet assembly 10 according to the subject invention showing multiple labels 11 configured therein. The multiple labels on the label sheet assembly are formed by die-cuts 12 in the top ply bordering each of the labels. It is understood and well recognized in the art that label sheet assemblies can comprise a single label or multiple labels. Moreover, it should be understood for purposes of the subject invention that the rectangular shaped labels are shown for illustration purposes only. The subject invention can be readily applied to any shape of label, including rectangular or square, circular or oval, and any irregular shape which has a border or edge. The embodiment shown, which is a standard mailing label sheet assembly provided on an 8.5×11 sheet, comprises thirty (30) rectangular labels configured in three columns of ten (10) labels each.

One or more vertical perforations 13 can be optionally provided in the assembly sheet to separate the columns. Alternatively, such perforations can be formed horizontally to separate rows of labels formed in the assembly. These horizontal or vertical perforations are preferably formed through both plies to provide for convenient separation. A print area A shown in the top, left label of the assembly shown in FIG. 1 is defined by dotted lines around the perimeter of the label. These dotted lines form no part of the invention and merely illustrate the area on which print toner is typically disposed on the label when passed through a printer.

Figure 2:
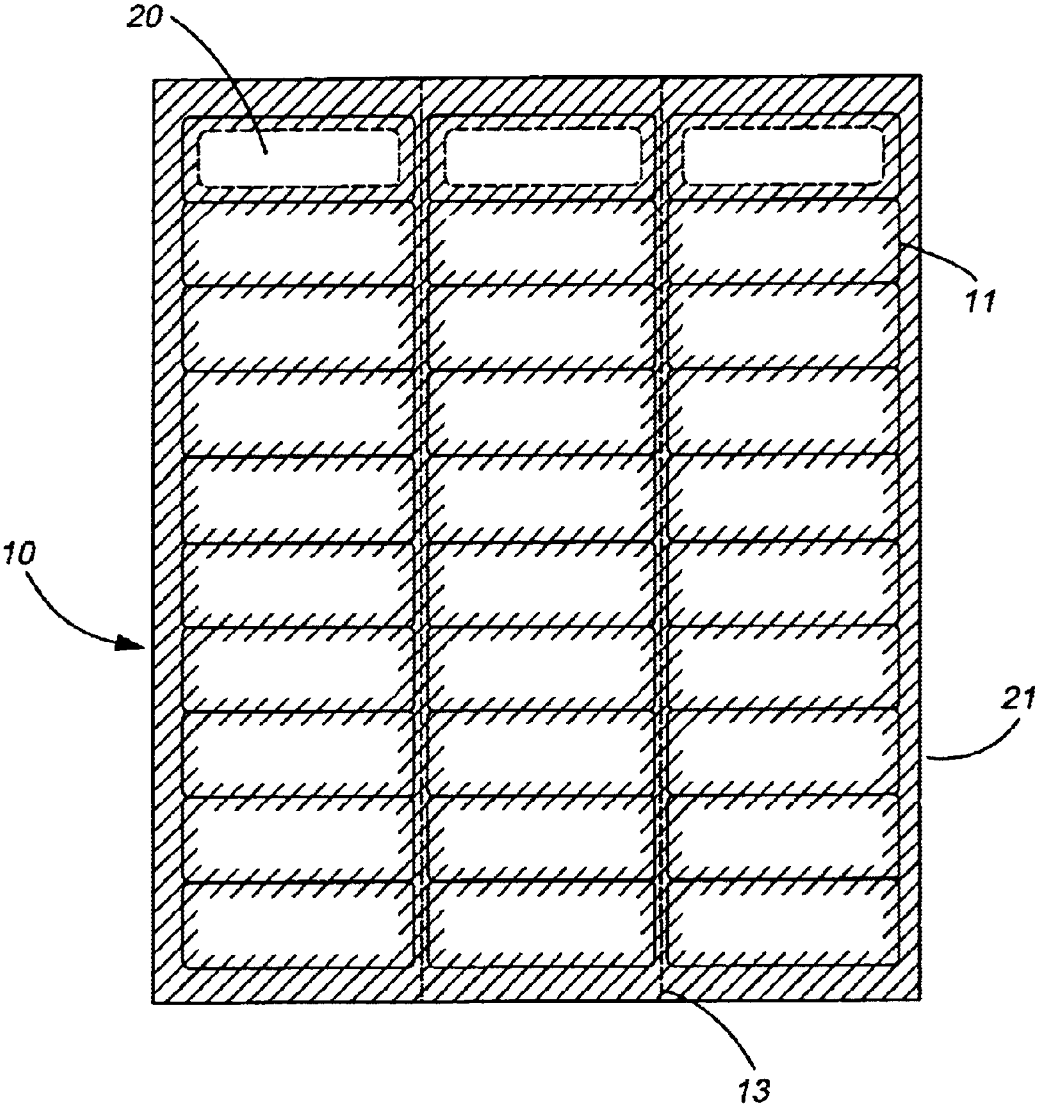
FIG. 2 is a plan view of the back (inner) face of the top ply of a label sheet assembly according to one embodiment of the subject invention, illustrating the configuration of adhesive (shown as shading) disposed on said inner face to provide said adhesive around the perimeter edges of each label formed in the sheet and an adhesive-free area on each label, the adhesive-free area corresponding positionally to the print area of each label on the outer face of said ply.

FIG. 2 is a plan view of the back (inner) face of the top ply of a label sheet assembly 10 according to one embodiment of the subject invention. Adhesive (shown as shading) is disposed on said inner face in a configuration which provides said adhesive around the perimeter edges of each label, leaving a centrally positioned adhesive-free area 20 on each label. As illustrated by the dotted lines shown in the top row of labels, the adhesive-free area preferably corresponds positionally to the print area of each label on the outer face of said top ply. Die-cuts 11 are also shown in this view and define the perimeter edges of the label formed in said top ply. In addition, the adhesive can preferably be disposed on the inner face of the top ply to provide an adhesive-free gap 21 bordering the perimeter edges of the assembly. This gap can be about one-sixteenth to about three-eighths inches in dimension so that the adhesive does not ooze from the edge of the form assembly and result in damage to the printer.

Figure 3:
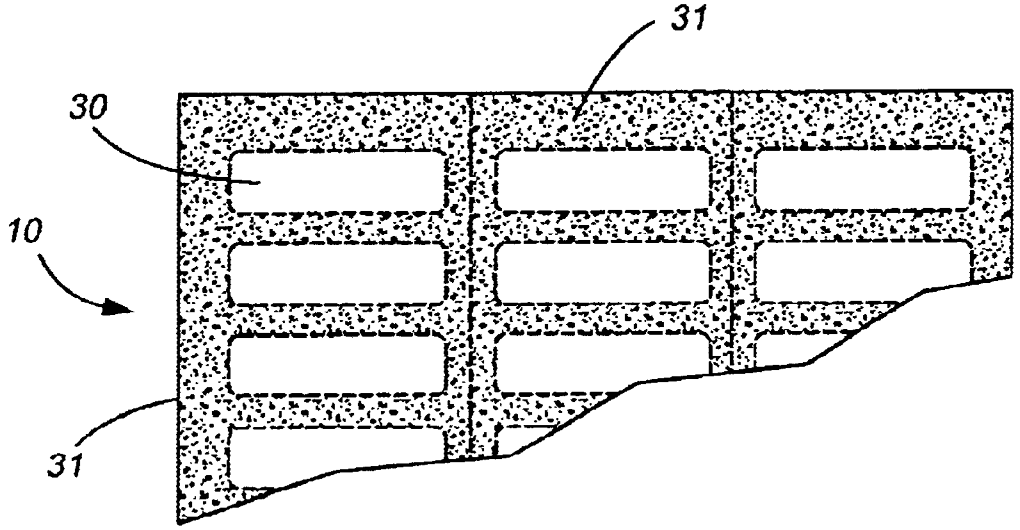
FIG. 3 is a partial plan view of the inner face of the back ply of a label sheet assembly according to one embodiment of the subject invention, illustrating the configuration of adhesive release material (shown as stippling) disposed on said inner face to provide said adhesive release around the perimeter edges of each label formed in the sheet and an adhesive release-free area on each label, the adhesive release-free area corresponding positionally to the print area of each label on the outer face of said ply.

FIG. 3 is a partial plan view of the inner face of the back ply of a label sheet assembly 10 according to one embodiment of the subject invention. Adhesive release material (shown as stippling) is disposed on said inner face in a configuration which provides said adhesive release material around the perimeter edges of each label, leaving a centrally positioned adhesive-free area 30 on each label. As illustrated by the dotted lines, the adhesive release-free area preferably corresponds positionally to the print area of each label on the outer face of the top ply. In addition, the adhesive release material on the inner face of the back ply can preferably be disposed to provide an adhesive release-free gap 31 bordering the perimeter edges of the assembly. This gap can be about one-sixteenth to about three-eighths inches in dimension so that the adhesive does not ooze from the edge of the form assembly and result in damage to the printer.

Alternatively, a wider adhesive release-free gap can be provided around the perimeter edge of the assembly such that adhesive disposed on the opposing face can adhere to the edges of the assembly and thereby prevent or substantially reduce the chance of separation of the plies.

Figure 4:
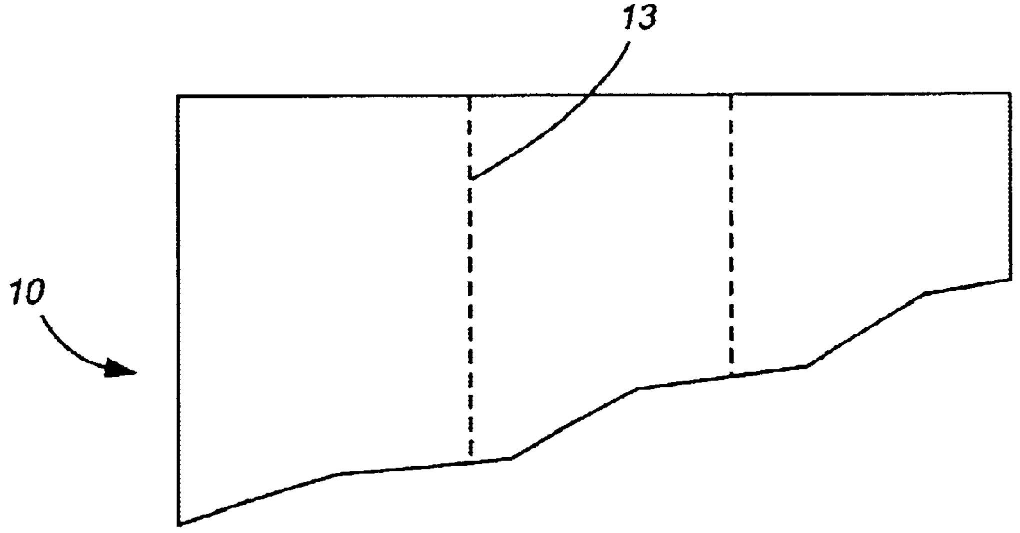
FIG. 4 is a plan view of the outer face of the back ply of a label sheet assembly according to one embodiment of the subject invention.

FIG. 4 is a partial plan view of the outer face of the back ply of a label form assembly 10 according to the subject invention. This illustration shows the optional vertical perforations 13 that can be provided in the assembly to facilitate separation of columns of labels. As described, one or more of such perforations can also be provided as horizontal perforations which can facilitate separation of rows of labels.

Figure 5A:
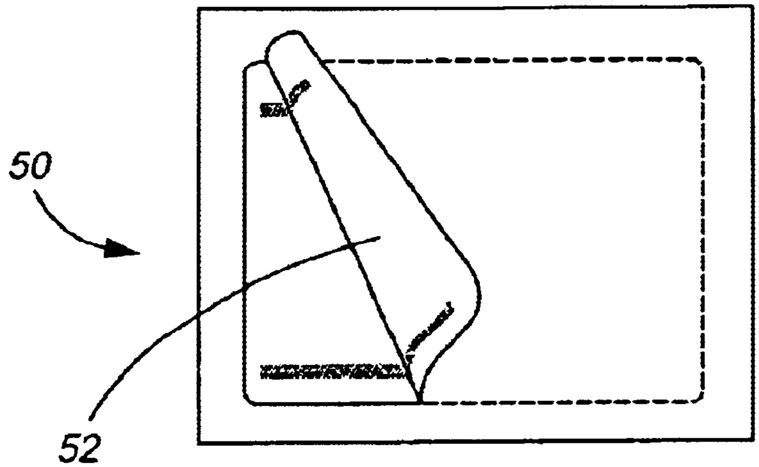
FIGS. 5A and 5B are a plan view of two alternative embodiments of the subject invention showing adhesive and adhesive release material disposed on at least two opposing perimeter edges of a label.
Figure 5B:
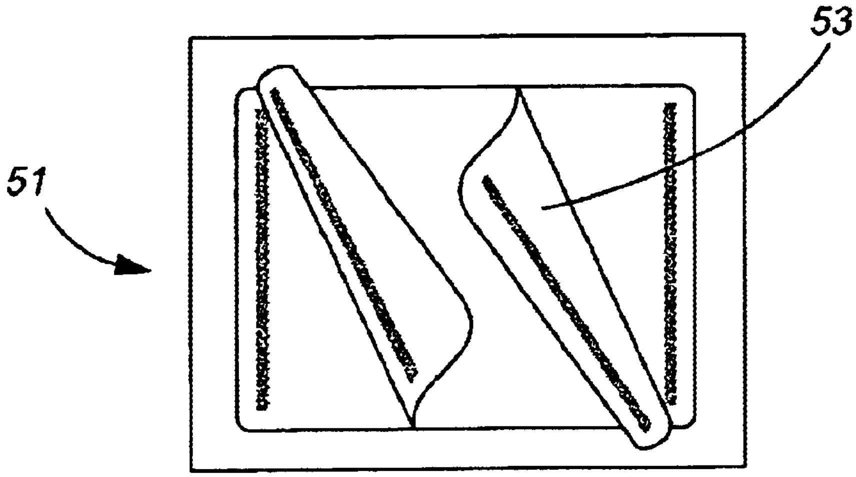

FIGS. 5A and 5B are plan views of two alternative embodiments 50 and 51 of label assemblies according to the subject invention showing adhesive (shading) and adhesive release (stippling) materials disposed on at least two opposing perimeter edges of a label. FIG. 5A shows adhesive and adhesive release material disposed on the top and bottom edges of label 52, and FIG. 5B shows adhesive and adhesive release material disposed on both side edges of label 53.

Figure 6A:
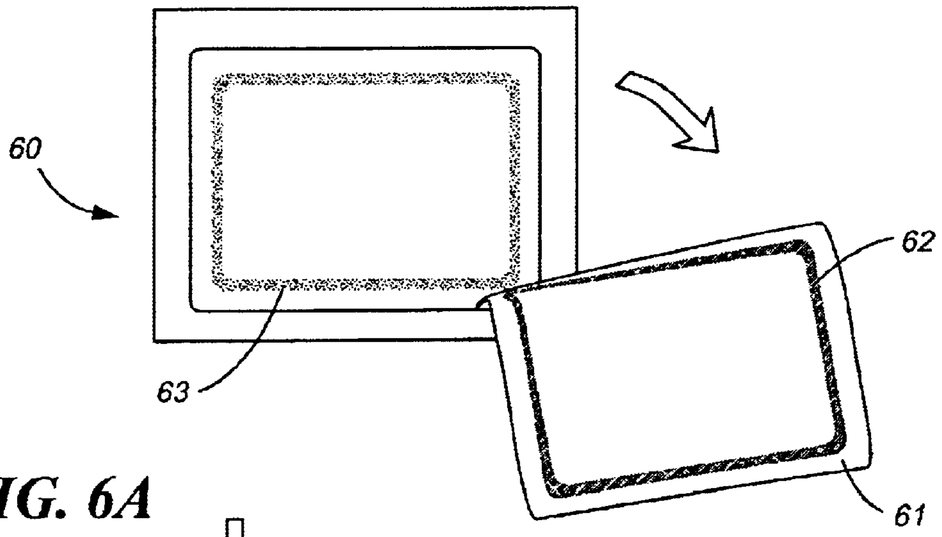
FIGS. 6A, 6B and 6C are a stepwise illustration of an embodiment of the subject invention in use, the illustration showing steps.
Figure 6B:
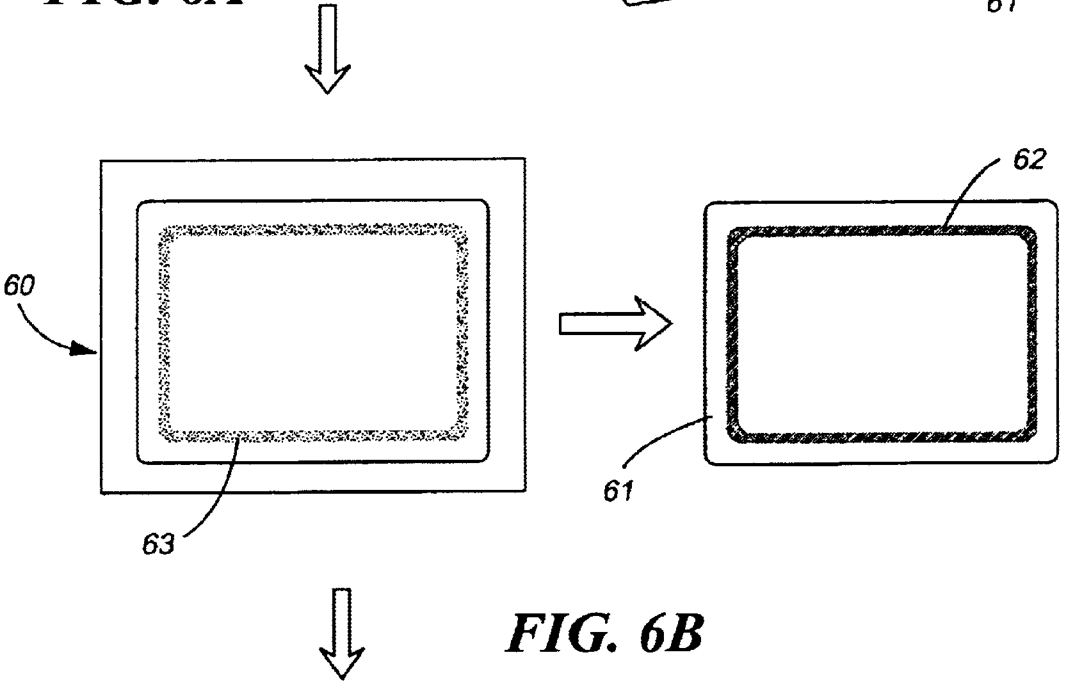
Figure 6C:
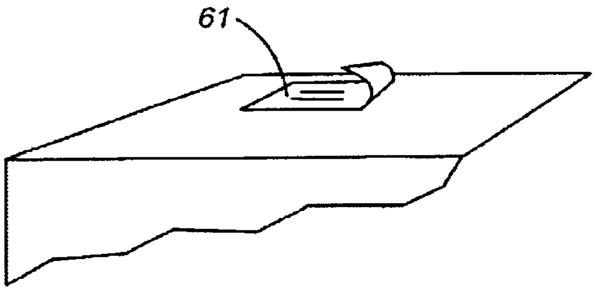

FIG. 6 is a stepwise illustration of the use of a label assembly 60 according to the subject invention, showing steps:

(a) peeling off a label 61 from the label assembly 60, exposing adhesive 62 and adhesive release 63 disposed on each ply of the label assembly to provide a removable label having adhesive framingly disposed on its perimeter edges;

(b) removing completely from the label assembly 60 label 61 formed in the top ply of the label assembly, said label 61 having adhesive 62 framingly disposed on its perimeter edges; and (c) adhering the removed label 61 onto another surface In addition to the labels described herein having adhesive and/or adhesive release framingly disposed thereon, a particular advantage of these labels can be realized by incorporating a plurality of slits or pores in the plies so that these slits or pores are provided in each of the labels of the assembly. When a label comprising these slits or pores is applied to a surface, air that may be trapped within the adhesive frame can escape from the label through these slits or pores. These slits or pores do not need to be formed as any particular size or shape; however, they are preferably small enough so that their presence does not affect the integrity of the label. Labels according to these embodiments of the subject invention are illustrated in FIGS. 7A and 7B. Specifically, an embodiment of a label 70 having slits 71 formed therein is shown in FIG. 7A. An embodiment of a label 72 having pores 73 formed therein is shown in FIG. 7B. The slits and pores shown in these Figures are exaggerated here for purposes of illustration only. Typically, these slits or pores are small enough so that they are not readily seen by the naked eye, and are visible only upon close inspection. The small dimension of these slits or pores helps maintain the integrity of the label before, during, and after its use.

The subject invention can prevent or substantially reduce the incidence of flaking or unintentional removal of toner from a label or form being printed by a laser printer. It was previously known that toner can improperly affix to certain adhesive-backed labels or forms and result in flaking of the toner when the user of said label manipulates the label. However, it was not previously recognized why such flaking was caused by, inter alia, the presence of adhesive or adhesive release material. The adhesive and adhesive release material can absorb into the pores of the substrate material and thereby prevent toner applied during the printing process to properly absorb onto or into the substrate be heat-fixed thereon. In addition, because toner can be a magnetic thermoplastic material which requires heat to properly affix to the substrate, it is now understood that adhesive or adhesive release material disposed behind the print area of the label can direct the required heat away from the print area of the label and prevent the toner from reaching critical temperatures necessary for heat-fixing.

To address this problem of toner flaking from the label, the subject invention provides an adhesive-free and adhesive release-free area on the inner faces of a two-ply label or form assembly corresponding to the print area on the outer face of the label or form. By framing the perimeter edges of the inner faces of the label or form with adhesive and adhesive-release material, the print area on the front face of the label or form does not have adhesive or adhesive-release material directly behind it. Accordingly, the pores of the substrate are not filled with adhesive or adhesive release material and are free to absorb toner. Moreover, the heat required to affix the toner is not carried away from the print area by adhesive or adhesive release material. Accordingly, the toner can be optimally disposed and affixed to the label surface.

Generally, the invention has been described in its preferred form or embodiment with some degree of particularity, it is to be understood that this description has been given only by way of example and that numerous changes in the details of construction, fabrication and use, including the combination and arrangement of parts, may be made without departing from the spirit and scope of the invention.

What is claimed is:

1. A two-ply label or form assembly for use with a non-impact printer employing a xerographic toner, said assembly comprising:

at least one printable label or printable form with a back release ply having an inner face and a top label ply having an outer face and a back face, the top label ply having on the outer face with at least one print area for disposing print toner during printing, wherein a perimeter edge for each label or form is defined by a die cut through the top label ply;

wherein the top label ply comprising adhesive on at least one perimeter edge of the back face disposed thereon, said adhesive being disposed in a configuration to provide an adhesive-free area, said adhesive-free area positionally corresponding substantially to the print area on the label or form;

wherein the inner face of the back ply comprising adhesive-release material disposed thereon, said adhesive release material corresponding positionally at least in part to the adhesive to provide an adhesive-release-material-free area;

whereby at least part of the print area on the form or label permits toner applied to the outer surface to reach a temperature for heat-fixing due to a combination of the adhesive-release-material-free area and the adhesive-free area formed underneath the outer face of the print area; and wherein the adhesive provides maximum adhesion on another surface when removed from the bottom backing ply so that the top label ply is permanently affixed thereon.

2. The label or form assembly of claim 1, wherein said label or form assembly further comprises adhesive release material which is silicon based.

3. The label or form assembly of claim 1 wherein the label or form comprises at least one slit or pore to allow air to escape from the adhesive-free area when the label or form is adhered to another surface during use.

4. The label or form assembly of claim 1 wherein the label or form assembly comprises a plurality of labels or forms on a single sheet of standard paper size.

5. The label or form assembly of claim 1 wherein the adhesive is pressure-sensitive adhesive.

6. The label or form assembly of claim 1 wherein the label or form assembly comprises two plies adhered together to form a two-ply sheet.

7. The label or form assembly of claim 1 wherein the label or form is rectangular.

8. The label or form assembly of claim 1 wherein the label or form is non-rectangular.

9. The label or form assembly of claim 7 wherein the adhesive is disposed on all four perimeter edges of the label or form, said disposition of the adhesive providing an adhesive-free frame around the corresponding print area of the label or form.

10. The label or form assembly of claim 8 wherein the adhesive is disposed around the entire perimeter edge of the label or form, said disposition of the adhesive providing an adhesive-free frame around the corresponding print area of the label or form.

11. The label or form assembly of claim 1 wherein the adhesive is disposed on perimeter edges of the label or form which are not parallel to a leading edge of the assembly fed through a non-impact printer.

12. A printable substrate comprising:

at least one printable area outer surface formed on a top ply, wherein the top ply includes a back face with adhesive disposed thereon on at least one perimeter edge underneath the printable area so as to form an area on the back face of the top ply free of adhesive underneath the printable area, wherein a perimeter edge for each printable area is defined by a die cut through the top ply;

at least one back ply having an inner face with adhesive-release material disposed thereon in a configuration corresponding positionally at least in part to the adhesive so as to form an area on the inner face of the back ply free of adhesive-release material underneath the printable area;

whereby at least part of the outer surface of the print area enables toner to be applied to reach a temperature for heat-fixing due to the combination of at least a two ply area underneath the printable area defined by the area free of adhesive on the back face of the top label ply and the area free from adhesive-release material on the inner face of the back ply; and wherein the adhesive provides maximum adhesion on another surface when removed from the bottom ply so that the top ply is permanently affixed thereon.

13. The printable substrate of claim 12, wherein the at least one printable area comprises one of a printable label and a form.

14. The printable substrate of claim 13, wherein the printable label includes a plurality of labels on a single sheet of standard paper size.

15. The printable substrate of claim 13, wherein the form includes a plurality of forms on a single sheet of standard paper size.

16. The printable substrate of claim 12, wherein the at least two ply area is one of a rectangular shape, square shape, circular shape, oval shape, and an irregular shape which has a perimeter edge.

17. The printable substrate of claim 12, wherein the at least two ply area is a substantially rectangular area underneath the printable area defined by the area free of adhesive on the back face of the top ply and the area free from adhesive-release material on the inner face of the back ply.

18. The printable substrate of claim 12, wherein the adhesive is a press-sensitive adhesive.

19. The printable substrate of claim 12, wherein the adhesive-release material includes silicon.

20. The printable substrate of claim 12, wherein the top ply comprises at least one of a silt and pore to allow air to escape from the area which is adhesive-free.

* * * * *